May 13, 1952 G. MANIERRE 2,596,265
PORTABLE LOADING AND UNLOADING CONVEYER
Filed May 21, 1947 2 SHEETS—SHEET 1
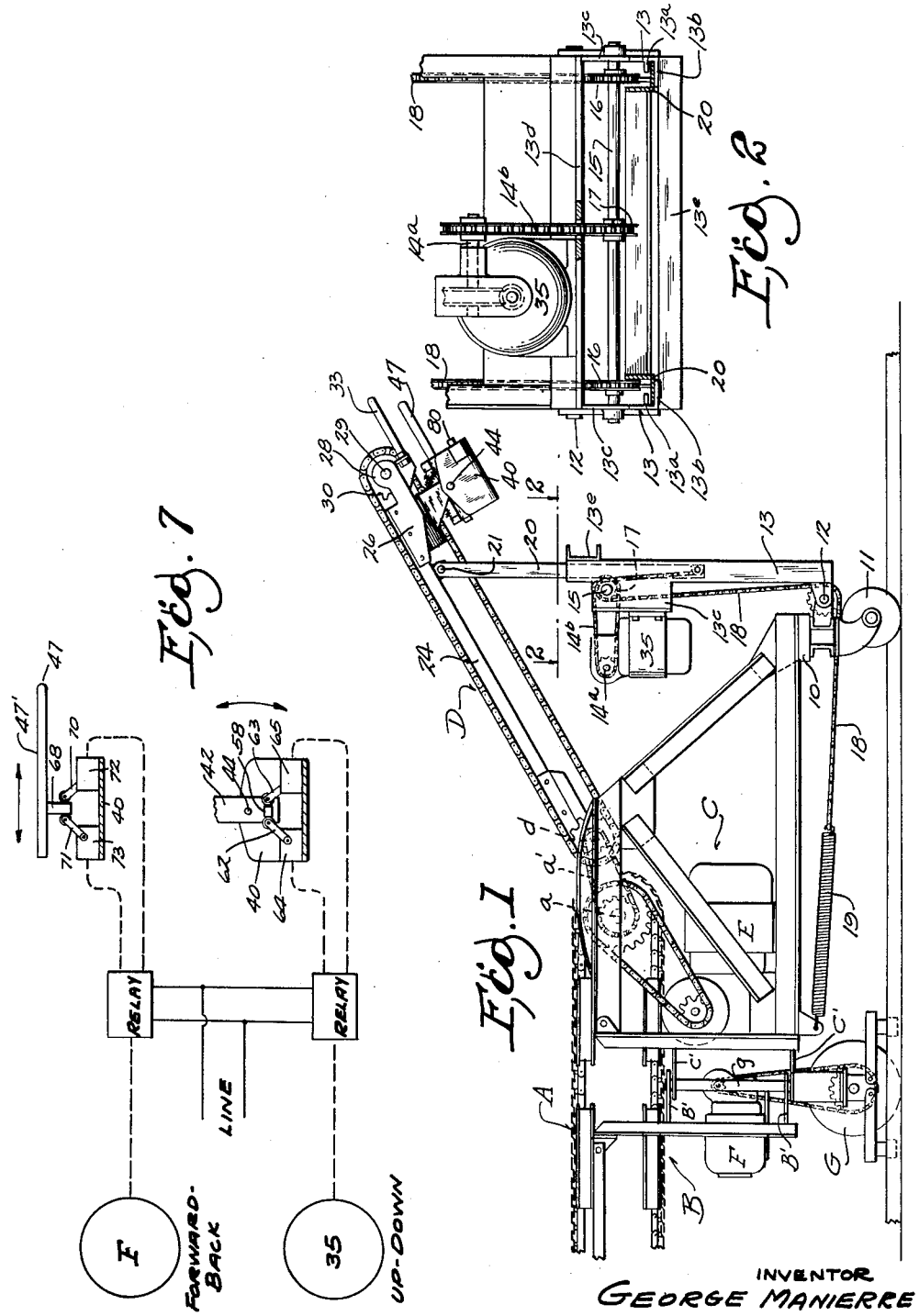
INVENTOR
GEORGE MANIERRE
BY Wheeler, Wheeler + Wheeler
ATTORNEYS

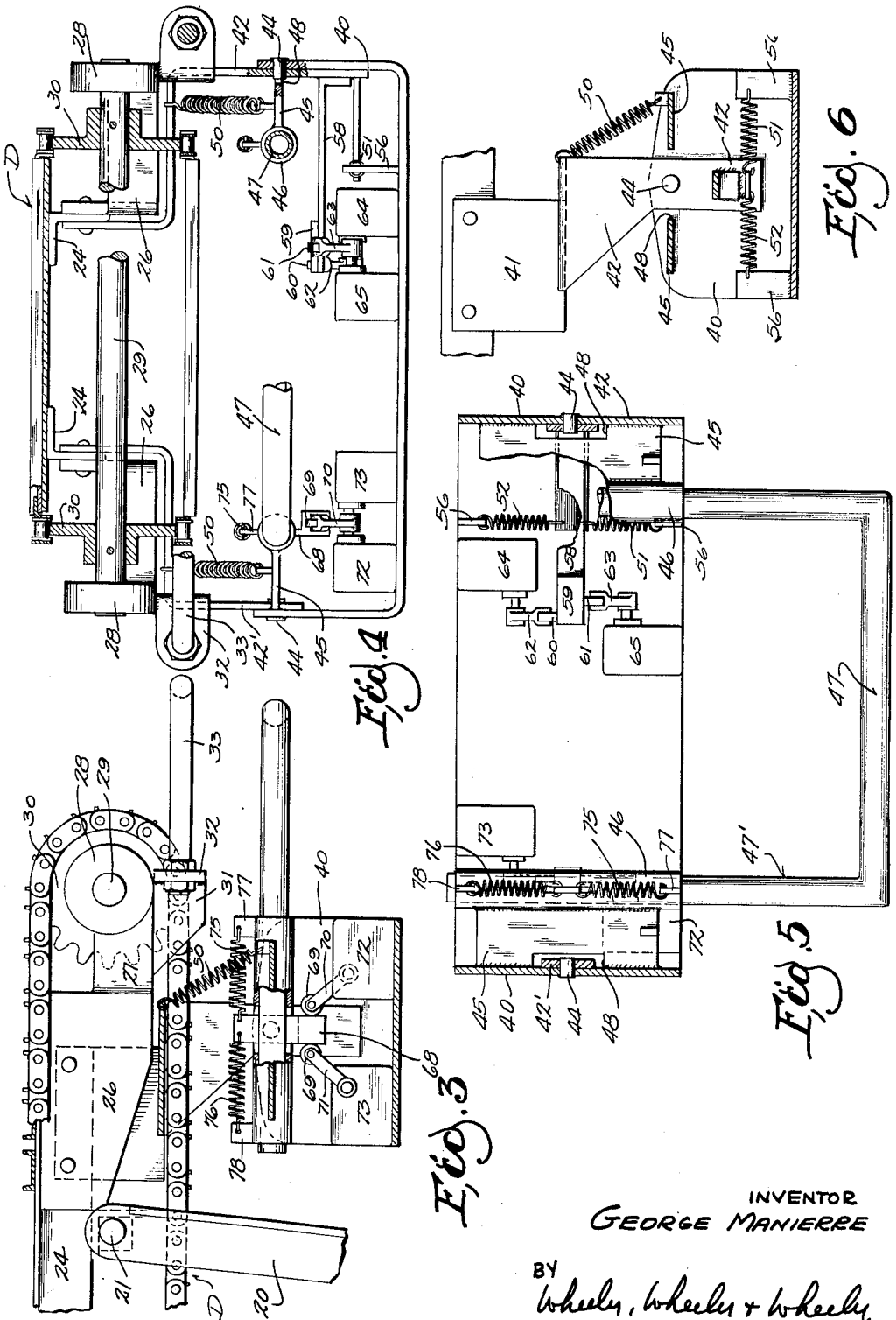

Patented May 13, 1952

2,596,265

UNITED STATES PATENT OFFICE 2,596,265

PORTABLE LOADING AND UNLOADING CONVEYER

George Manierre, Milwaukee, Wis.

Application May 21, 1947, Serial No. 749,456

10 Claims. (Cl. 198—99)

My invention relates to improvements in motion controlling devices for portable loading and unloading conveyors.

The object of my invention is to provide means whereby a single operator standing at the delivery end of such a conveyor for the purpose of receiving and depositing articles carried by the conveyor, may cause the conveyor to advance or retract and regulate the elevation at which the articles will be delivered, without interrupting the continuity of delivery.

More specifically, my object is to provide conveyors of the described class with motor driven traction wheels, one or more motor driven conveyor belts, and separate motor driven means for raising and lowering the delivery end of the conveyor, all of the motors being subject to switch control from a switch box or cage carried by the delivery end of the conveyor, whereby an operator receiving articles delivered by the conveyor may also control each of the motors without interference with his duty to receive and deposit the delivered articles.

A further object is to provide means whereby the operator of a loading or unloading conveyor may be provided with an arm rest for supporting his hands in a raised position and an associated switch operated member to be swung upwardly or downwardly to regulate the height at which articles are to be delivered and moved forwardly or backwardly to advance or retract the conveyor, all without materially shifting his arms and hands from article receiving position.

A further object is to provide conveyors of the described class with a switch carrying cage suspended from the delivery end of the conveyor, in a position for convenient operation of the switches while the conveyor is in operation.

In the drawings:

Figure 1 is a side elevation of the delivery end portion of a loading or unloading conveyor, showing an auxiliary conveyor belt with its delivery end raised.

Figure 2 is a sectional view drawn to line 2—2 of Figure 1.

Figure 3 is a fragmentary view of the delivery end of the auxiliary conveyor belt on an enlarged scale, showing the same with its associated switch box or cage partly in side elevation and partly in section.

Figure 4 is a rear end elevation of the same with the conveyor belt removed and other parts partially broken away.

Figure 5 is a plan view of the switch box or cradle, with its end walls and supporting hangers shown in horizontal section.

Figure 6 is a sectional view drawn to line 6—6 of Figure 5.

Figure 7, (Sheet 1), is a conventional diagram of the switches for controlling two of the motors.

Like parts are identified by the same reference characters throughout the several views.

Figure 1 illustrates in side elevation the rear end portion of a portable loading conveyor of the general type shown and described in my Patent No. 2,250,933, dated July 29, 1941.

A universally flexible conveyor member A is mounted upon a train of pivotally connected truck sections of which only the two rear sections B and C are illustrated in Figure 1. The rear end of the conveyor member A travels about sprocket wheels connected with an end shaft $a$ and transfers its load to a delivery conveyor member D, the inner end shaft $d$ of which is driven from the shaft $a$ by a chain $a'$. The member D of the conveyor may have its rear or delivery end raised or lowered to vary the point of delivery. A motor E mounted on the truck section C is utilized to drive the conveyor, and another motor F of the reversible type is preferably mounted on the truck section B and utilized to drive the traction wheels G, whereby the conveyor may be advanced or retracted. Two conveyor members A and D are preferably employed in order that the member A may be universally flexible and capable of conveying articles along either a straight path or a path which curves in either direction, whereas the member D is short and is intended to deliver the articles in a straight line, either horizontally or pitched at various inclinations, and can therefore be constructed at less expense per lineal foot.

The opposing end frames of the truck sections B and C have spacing arms B' and C' pivotally connected by a king bolt or pivot post $g$ extending upwardly from a bolster carried by the axle of the traction wheels G, whereby section C may be swung to the right or left, or aligned with section B, as occasion may require.

The parts thus far described may be of any ordinary construction, and it is immaterial to the invention herein claimed whether the conveyor comprises two or more members or only one. Therefore it is referred to in this description and in the appended claims as a conveyor having a delivery end portion which can be raised or lowered and as a portable conveyor which can be advanced or retracted by motor driven traction wheels.

For the purposes of this invention, the rear end member 10 of the section C is supported by caster-like wheels 11 and has projecting ears in which a shaft 12 is mounted to which is pivoted the supporting frame of a hoist for raising and lowering the delivery end of the conveyor member D in a manner now to be described.

The supporting portion of the hoist comprises a frame composed of side bars 13, each provided with spaced inwardly projecting flanges 13a and 13b which form a runway for an angle-shaped hoisting slide. The upper end portions of the bars 13 have welded forwardly extending portions 13c, cross connected with those of the other side bar extension 13c by a mounting plate 13d to which a motor 35 is secured. The flanges 13b are cross connected by channel bars 13e, and a shaft 15 is journaled in the extensions 13c of the bars 13 and provided with sprocket wheels 16 and a driving sprocket 17 connected with a motor driven shaft 14a by a chain or belt 14b.

The lower end of the flange 13b is pivoted to the shaft 12 at the rear end of the truck section C, and chains 18, having one end connected with the truck section C by elongated tension springs 19, extend around sprocket wheels on the shaft 12 and upwardly over the sprocket wheels 16 and downwardly to the lower ends of the angle-shaped hoisting bars 20 having one flange slidingly received between the flanges 13a and 13b of the supporting frame bars 13, and their upper ends pivotally secured at 21 with the frame bars 24 of the delivery member of the conveyor. The shaft d at the receiving end of this conveyor is journaled in the front ends of these frame bars 24, and the outer or rear end portions of the frame bars 24 have brackets 26 (Figure 3) secured thereto and provided with laterally offset portions 27, having rounded rear ends 28, in which the rear shaft 29 of the conveyor member D is journaled.

The shaft 29 carries the sprocket wheels 30 about which travel the supporting chains of the conveyor member D. The portion 27 of the bracket 26 which supports said shaft 29 is provided with depending elbowed flanges 31, and to the elbowed portions 32 of these flanges are secured the side arms of a yoke-shaped steady rest 33 upon which the arms of the operator may be supported in a raised position for grasping articles delivered by the conveyor.

A switch box or cradle has walls 40 suspended from the outer end portions of the angle bars 24 by brackets 41 and hangers 42 and 42'. The brackets 41 are riveted to the bars 24 and respectively support the hangers 42 and 42' in a depending position. The walls 40 of the cradle are provided near their upper margins with inwardly projecting stud shafts 44 which pivotally connect the cradle with the hangers 42 and 42', whereby the cradle may be rocked forwardly and backwardly from its neutral position as shown in Figures 1 and 6.

The cradle walls 40 have inwardly projecting web-like arms 45 substantially parallel with the bottom of the cradle and provided with sleeve-like members 46 at their inner margins, in which the side arms of a yoke-like controlling lever 47 are telescopically received. Both of the web-like arms 45 are provided with notches 48 through which the hangers 42 and 42' loosely extend. The notches 48 are of sufficient length to allow the cradle to be rocked upon its supporting stud shafts 44 when the lever 47 is raised or lowered from its normal position of parallelism with conveyor member D and steady rest 33.

The weight of the lever 47 is counterbalanced by coiled tension springs 50 which connect one outer side margin of the web 45 with the horizontal portion of the hanger 41 as shown in Figures 4 and 6. Another set of springs 51 and 52 tend to hold the cradle in its normal position, as shown in Figures 1 and 6, since these springs connect the lower end of the hangers 42 with cradle brackets 56 at the respective sides of the associated hanger.

The hanger 42 is provided with a switch actuating arm 58, the inner end of which is thickened at 59 and interposed between rollers 60 and 61 carried by switch arms 62 and 63 for operating switches in the switch boxes 64 and 65, respectively. These switches control the operation of motor 35 for raising or lowering the delivery end of the conveyor member D. A downward movement of lever 47 causes arm 58 to actuate switch arm 63 to close the switch in the switch box 65 and operate the motor to swing the delivery end of the conveyor toward a horizontal position, whereas by raising the lever 47, switch arm 62 will be actuated to close the switch in the box 64 and operate the motor in the opposite direction to raise the delivery end of the conveyor.

The side arm 47' of the lever 47 is provided with a cross piece 68, the lower end of which extends between rollers 69 carried by switch arms 70 and 71 for operating switches in the switch boxes 72 and 73. These switches control the circuits of the reversible electric motor F (Figure 1), whereby the traction wheels G may be driven either forwardly or backwardly to advance or retract the conveyor. By moving the lever 47 in its supporting sleeves 46, arm 71 is actuated to close the switch in the box 73 and set motor F in operation to retract the conveyor, whereas by pulling the lever 47 outwardly from its normal position, switch lever 70 will be actuated to reversely operate the motor and actuate the conveyor in the direction of the operator. Normally the lever 47 is held in a neutral position by a set of springs 75 and 76 which connect the upper end of the cross piece 68 with cradle brackets 77 and 78, respectively.

From the foregoing description it will be understood that an operator standing at the delivery end of the conveyor may have his arms supported on the steady rest 33 with his hands in a position to grasp articles which are being delivered successively by the conveyor D as fast as he can receive and pile them in a car or warehouse. As the pile increases in height he can periodically raise lever 47 to start the motor 35 in a direction to lift the delivery end of the conveyor until the pile of articles has reached the desired height. Thereupon, by pushing the side arms of lever 47 inwardly in their supporting sleeves 46, he can close the circuit of motor F to start that motor in a direction to retract the conveyor preparatory to starting a new pile of articles.

While the conveyor is thus being retracted, he can also depress the lever 47 to start motor 35 in a reverse direction and lower the delivery end of the conveyor. As soon as the operator releases his grasp on the lever 47 it is returned to its normal neutral position of paralellism with the steady rest 33 by the springs 51 and 52, and it is also returned to its normal neutral position in the sleeves 46 by the springs 75 and 76.

Ordinarily, the vertically swinging adjustments of the delivery end of the conveyor and the movement of the traction wheels G to advance or retract the conveyor will be so quickly accomplished that the conveyor may be continuously driven by the motor E while these adjustments are being made. However, if it is found desirable to stop the motor E, this can be done by the same operator by manually actuating a switch lever 80 on the side of the cradle. This lever 80 controls the circuit of the conveyor driving motor E.

It will of course be understood that the motors are operated electrically. Ordinarily they will be supplied with current from an outlet in a warehouse, from which or into which articles are being delivered by the conveyor.

The motors for actuating the traction wheels and for operating the hoist to raise or lower the rear end portion of the conveyor frame are reversible electric motors which are at rest when the switches are in their neutral positions, and the parts are sufficiently counterbalanced so that they will remain in their adjusted position when the motor controlling switches are in their normal circuit breaking positions.

I claim:

1. The combination with a portable loading and unloading conveyor, of a motor for advancing and retracting the conveyor, a separate motor provided with hoisting mechanism for raising and lowering the delivery end of the conveyor, and manually operable motor controlling mechanism at the delivery end of the conveyor and including a member movable in two directions for controlling one of the motors and in two other directions for controlling the other motor.

2. The combination with a portable loading and unloading conveyor having a delivery end portion connected with the main portion of the conveyor by a transverse pivot shaft, of a lever connected with the delivery end of the conveyor for swinging movement in a vertical plane and also adapted for sliding movement in another plane, motor driven mechanism controlled by swinging movements of the lever in the vertical plane for raising and lowering the delivery end of the conveyor, and separate motor driven mechanism controlled by the sliding movements of the lever for advancing and retracting the conveyor, whereby a single operator engaged in the reception of articles delivered by the conveyor may also control operation of the motors.

3. Hoisting means for the delivery end portion of a portable loading and unloading conveyor, comprising the combination with a conveyor supporting truck, of an upright hoist frame having its lower end pivotally connected with the truck and its upper portion provided with a sliding extension in supporting relation to said delivery end portion of the conveyor, a hoisting shaft journaled in the upper portion of the frame, an idle shaft journaled in the lower portion of the frame, sprocket wheels fixed to the respective ends of said shafts, hoisting chains connected with the lower end of the sliding extension and each extending upwardly over a sprocket wheel on the hoisting shaft and downwardly around a sprocket wheel on the idle shaft, said chains being connected by a counterbalancing spring with the conveyor supporting truck, and a motor operatively connected with the hoisting shaft to actuate the hoisting shaft sprockets.

4. A combination as set forth in claim 3, in which the motor is a reversible electric motor having its circuits controlled by manually operable switches carried by the delivery end portion of the conveyor.

5. The combination with an electrically operable loading and unloading conveyor having a plurality of reversible electric motors, of a set of hangers depending from the respective sides of the delivery end of the conveyor, a switch cradle pivotally suspended from said hangers, a set of motor controlling switches mounted on one of the hangers within the cradle, another set of motor controlling switches mounted on the cradle, and a cradle rocking lever slidably mounted in the cradle with a handle portion extending beyond the delivery end of the conveyor, said lever having a switch actuating arm for operating the switches mounted on the cradle and said cradle having an arm for operating the switches mounted on the hanger.

6. The combination of a truck supported loading and unloading conveyor provided with a conveyor operating electric motor, a truck driving reversible electric motor, and a third electric motor provided with hoisting mechanism for raising and lowering the delivery end of the conveyor, a set of hangers depending from the side portions of the delivery end of the conveyor, a set of switches carried by one of the hangers and controlling the electric circuit of the conveyor hoisting motor, a switch supporting member pivotally connected with the hangers and provided with a set of switches controlling the truck driving motor, a lever slidably mounted on said member and having an arm in a position to alternatively close the switches of the last mentioned set, and said switch supporting member having an arm in position for alternatively closing the switches of the hanger supporting set when said member is rocked by the lever upon its pivotal connection with the hangers.

7. The combination of a truck supported loading and unloading conveyor provided with a conveyor operating electric motor, a truck driving reversible electric motor, and a third electric motor provided with hoisting mechanism for raising and lowering the delivery end of the conveyor, a set of hangers depending from the side portions of the delivery end of the conveyor, a set of switches carried by one of the hangers and controlling the electric circuit of the conveyor hoisting motor, a switch supporting member pivotally connected with the hangers and provided with a set of switches controlling the truck driving motor, a lever slidably mounted on said member and having an arm in a position to alternatively close the switches of the last mentioned set, said switch supporting member having an arm in position for alternatively closing the switches of the hanger supporting set when said member is rocked by the lever upon its pivotal connection with the hangers, and tension springs for normally holding said member and the lever in neutral positions with the motor controlling switches in circuit breaking positions.

8. The combination with a portable loading and unloading conveyor having a pivoted end frame adapted for swinging movement in a vertical plane, the combination with the swinging end of said frame of a set of forwardly projecting side arms, a transversely disposed steady rest connected with said side arms and a motor controlling lever having a handle portion parallel with the steady rest, and side arms pivotally and slidably supported from said member of the conveyor frame.

9. The combination with a portable loading and unloading conveyor having a pivoted end frame adapted for swinging movement in a vertical plane, the combination with the swinging end of said frame of a set of forwardly projecting side arms, a transversely disposed steady rest connected with said side arms and a motor controlling lever having a handle portion parallel with the steady rest, and side arms pivotally and slidably supported from said member of the conveyor frame, said lever having an associated motor for raising and lowering said conveyor member when the lever is swung about its pivotal connection, and another motor for advancing and retracting the conveyor when the lever is slidably adjusted with reference to said conveyor frame.

10. In a device of the character described the sub-combination with a hanger and a cradle pivotally connected to the hanger, of a switch control bar having a mounting on the cradle in which the bar is reciprocable in one plane but by means of which the cradle may be pivoted upon the hanger in a transverse plane, two sets of opposed limit switches mounted on the cradle, a switch operator projecting from said bar to a position intermediate the opposed limit switches of one of said sets, and a switch operator projecting from said hanger to a position intermediate the opposed switches of the other of said sets, whereby the switches of one of said sets are operated by reciprocable movement of the bar in its mounting and the switches of the other of said sets are actuated by pivotal movement of the cradle on the hanger.

GEORGE MANIERRE.

REFERENCES CITED

The following references are of record in the file of this patent:

UNITED STATES PATENTS

| Number | Name | Date |
|---|---|---|
| 890,689 | McCabe | June 16, 1908 |
| 897,462 | Hanak | Sept. 1, 1908 |
| 1,261,702 | Christensen | Apr. 2, 1918 |
| 1,392,069 | McDermott | Sept. 27, 1921 |
| 1,399,130 | Lewis | Dec. 6, 1921 |
| 2,066,137 | Cartlidge | Dec. 29, 1936 |
| 2,360,282 | Russell | Oct. 10, 1944 |
| 2,430,945 | O'Brien | Nov. 18, 1947 |
| 2,495,647 | Vaughn | Jan. 24, 1950 |